A. ECKARDT.
BLOWING CAN.
APPLICATION FILED AUG. 6, 1908.
913,816.
Patented Mar. 2, 1909.
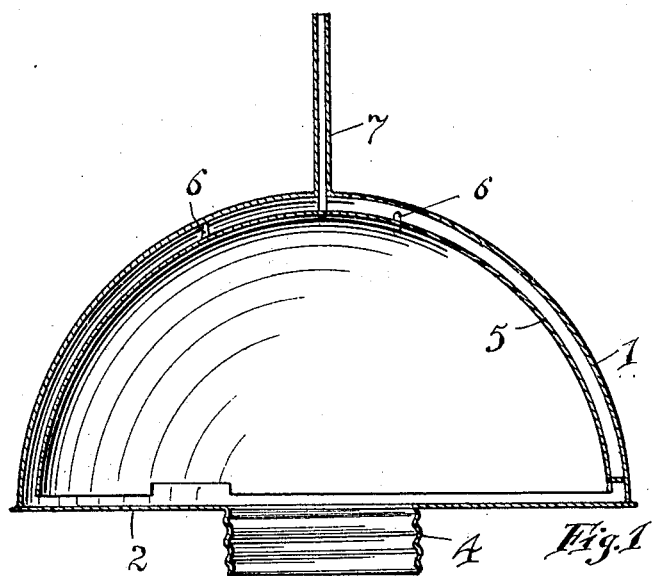
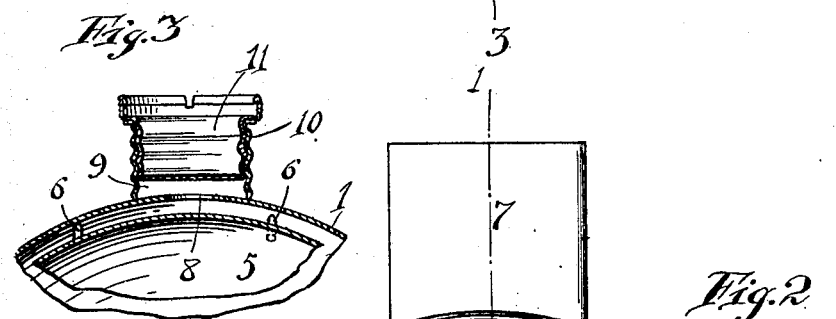
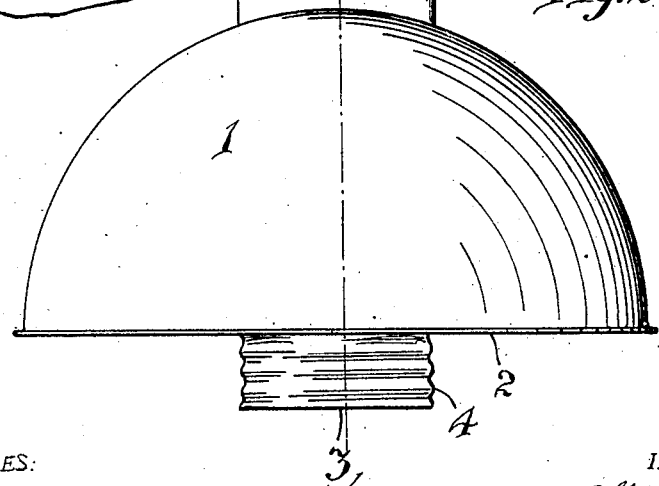
WITNESSES:
Geoffrey Holt.
Nellie B. Keating.
INVENTOR,
Albin Eckardt,
BY
F. M. Wright,
ATTORNEY.

UNITED STATES PATENT OFFICE.

ALBIN ECKARDT, OF SAN FRANCISCO, CALIFORNIA.

BLOWING-CAN.

No. 913,816.    Specification of Letters Patent.    Patented March 2, 1909.

Application filed August 6, 1908. Serial No. 447,330.

*To all whom it may concern:*

Be it known that I, ALBIN ECKARDT, a subject of the Emperor of Germany, residing at San Francisco, in the county of San Francisco and State of California, have invented new and useful Improvements in Blowing-Cans, of which the following is a specification.

The present invention relates to blowing cans for blowing powder, such as finely pulverized plumbago, used in foundries, or germicidal powder overgrowing fruits and vegetables, or wherever it is desired to distribute powder in a very fine layer.

In the accompanying drawing, Figure 1 is a sectional view on the line 1—1 of Fig. 2; Fig. 2 is a side view; Fig. 3 is a broken sectional view, showing a modified form of nozzle.

Referring to the drawing, 1 indicates an outer hemispherical casing, provided with a base 2, having a central aperture surrounded by a neck 3, by means of which the casing can be filled with powder. Said neck is threaded, as shown at 4, so that it can be screwed to the nozzle of a bellows or other similar device for forcing air under pressure into the interior of the casing. Within the casing is a hemispherical wall or partition 5, connected to the casing at points near the lower edge by means of parts of said lower edge bent outwards and soldered to the casing. It is so arranged within the casing that the lower edge of the wall is spaced a short distance from the base, and the hemispherical wall itself is spaced about the same distance from the casing. The wall is provided near the top or center with studs 6, which abut against the inner surface of the casing and space said top from said casing. The casing is provided at the top or center of the hemispherical portion with a nozzle 7, which in the form shown in Figs. 1 and 2, is broad and flat, while in the modification shown in Fig. 3, an opening 8 from the casing discharges into a round sleeve or neck 9, which is threaded, as shown at 10, so that it can be closed by a threaded cap 11. The round nozzle 9, is only used in cases where it is desired to close the powder in the can against the access of air thereto.

In operation the powder is supplied to the interior of the hemispherical wall, and then when compressed air is forced into the wall, the powder is driven with the air around the lower edge of the wall and through the narrow space between the hemispherical wall and casing to the nozzle, and is then discharged from said nozzle in a fine powder.

I claim:—

1. A blowing can comprising a casing having a discharge opening, a wall arranged within said casing so as to have a free edge remote from said discharge opening, and a closed part adjacent to said discharge opening, said casing being formed with an aperture by which compressed air can be admitted to the interior of said casing and within said wall, substantially as described.

2. A blowing can comprising a casing having a discharge nozzle and compressed air supply opening opposite to said nozzle, a concave wall spaced a short distance from said casing and having a closed part adjacent to said nozzle and a free edge remote therefrom, said supply opening being arranged to convey air into the interior of said wall, substantially as described.

3. A blowing can, comprising a casing having a rounded part and a flat part or base, a hollow wall within said casing conforming in shape to the rounded part and spaced a short distance therefrom, said casing being provided with a nozzle, and a base being formed with a supply opening opposite to said nozzle, said wall being closed adjacent to said nozzle and having a free edge remote therefrom, substantially as described.

In testimony whereof I have hereunto set my hand in the presence of two subscribing witnesses.

ALBIN ECKARDT.

Witnesses:
 H. B. DENSON,
 NELLIE B. KEATING.